(12) United States Patent
Canby

(10) Patent No.: US 6,360,690 B1
(45) Date of Patent: Mar. 26, 2002

(54) SELF-CLEANING BIRD FEEDER

(75) Inventor: Thomas D. Canby, Westchester, PA (US)

(73) Assignee: GCB Bird Products, LLC, Chilton, WI (US)

( * ) Notice: Subject to any disclaimer, the term of this patent is extended or adjusted under 35 U.S.C. 154(b) by 0 days.

(21) Appl. No.: 09/481,342

(22) Filed: Jan. 12, 2000

(51) Int. Cl.7 .............................................. A01K 39/01
(52) U.S. Cl. ..................... 119/52.2; 119/57.8; 119/429; 119/432; 119/469
(58) Field of Search .............................. 119/52.2, 52.3, 119/57.8, 57.9, 469, 429, 432

(56) References Cited

U.S. PATENT DOCUMENTS

| | | | |
|---|---|---|---|
| 1,749,497 A | 3/1930 | McGlashan | |
| D115,321 S * | 6/1939 | Pueschel | |
| 2,634,705 A * | 4/1953 | Mayes | |
| 2,786,446 A * | 3/1957 | Newman | |
| 3,083,687 A * | 4/1963 | Slaven | |
| 3,568,641 A | 3/1971 | Kilham | 119/51 |
| D231,369 S | 4/1974 | Kilham | D30/3 |
| 3,888,211 A | 6/1975 | Allen | 119/18 |
| D249,285 S | 9/1978 | Podjan | D30/15 |
| 4,204,500 A | 5/1980 | Podjan | 119/52 R |
| 4,259,927 A | 4/1981 | Clarke | 119/51 |
| 4,327,669 A * | 5/1982 | Blasbalg | 119/57.8 |
| 4,829,934 A * | 5/1989 | Blasbalg | 119/57.8 |
| 4,940,019 A | 7/1990 | Coffer | 119/522 |
| 5,062,388 A * | 11/1991 | Kilham | 119/52.2 |
| 5,095,847 A * | 3/1992 | Coffer | 119/52.2 |
| 5,123,380 A * | 6/1992 | Edwards | 119/57.8 |
| 5,168,830 A * | 12/1992 | Deglis | 119/428 |
| 5,410,986 A | 5/1995 | Washam | 119/52.2 |
| 5,711,247 A * | 1/1998 | Henshaw | 119/57.8 |
| 5,722,344 A * | 3/1998 | Rank | 119/57.8 |
| 5,758,596 A | 6/1998 | Loiselle | 119/52.2 |
| 5,826,539 A | 10/1998 | Bloedorn | 119/52.2 |
| 5,829,382 A * | 11/1998 | Garrison | 119/52.2 |
| 5,924,381 A * | 7/1999 | Bloedorn | 119/52.2 |
| 5,988,111 A * | 11/1999 | Kujath | 119/469 |

* cited by examiner

Primary Examiner—Charles T. Jordan
Assistant Examiner—Yvonne R. Abbott
(74) Attorney, Agent, or Firm—Boyle, Fredrickson, Newholm, Stein & Gratz, S.C.

(57) ABSTRACT

A self-cleaning multistage bird feeder having a plurality of truncated hollow cones or funnels stacked vertically end to end. The truncated cones are stacked large end up with adjacent cones being spaced apart to define a plurality of annular feeding troughs. The feeder includes a cover over the uppermost cone and a disc under the lowermost cone. Perches extend outwardly from the cones and the disc. Bird food consequently travels downward through the feeder due to the feeding action of the birds. Bird food is purged from the bottom of the feeder and spills onto an apertured tray suspended under the disc. Additionally a hopper type feeder comprising a single truncated hollow cone or funnel, cover, disc and apertured tray wherein the disc provides a self cleaning platform feeding area and the disc and suspended tray provide superior viewing of feeding activity compared to conventional hopper type feeders.

44 Claims, 5 Drawing Sheets

SELF-CLEANING BIRD FEEDER

BACKGROUND OF THE INVENTION

1. Field of the Invention

The present invention relates to a novel feeding portal and tray arrangement installed at the bottom of a tubular type bird feeder wherein the feeding portal is designed to provide spillage of food to birds feeding at the tray in an amount such that the feeder is substantially self cleaning of food debris, and unattractive kinds of seed often contained in mixes are purged, to prevent their excessive accumulation within the feeder. The novel feeding portal and tray arrangement disclosed herein also has application for improving performance of hopper type bird feeders by providing a self cleaning feeding area at the bottom of the hopper, thereby increasing feeder attractiveness to birds, and by allowing a fuller view of feeding activity. The present invention furthermore relates to a novel trough type feeding portal, optional as an additional design improvement to tubular type bird feeders, which enhances results with respect to self cleaning and as a feeding portal to attract greater numbers and variety of birds than conventional feed ports of the type typically installed in tubular feeders.

2. Background of the Related Art

Many different types and designs of bird feeders have been developed. Examples of several designs of bird feeders that have been patented include: Kilham, U.S. Pat. No. 3,568,641 and Des. 231,369; Clarke, U.S. Pat. No. 4,259,927; Coffer, U.S. Pat. No. 4,940,019; Tucher, Des. U.S. Pat. No. 352,138; Washam, U.S. Pat. No. 5,410,986; Loiselle, U.S. Pat. No. 5,758,596; and, Bloedorn, U.S. Pat. No. 5,924,381.

A serious problem common to many tubular type bird feeders is a loss of attractiveness to birds when food debris, and unattractive kinds of seed contained in mixes, accumulate in the feeding portals from which birds extract food. Also, a food spoilage problem that can occur in dead-ended food inventory below the lowest portals. In an extreme case, birds may find no attractive food at the portals. To lessen these problems and maintain a high level of attractiveness to birds, it is necessary for the feeder operator to frequently clean the feeder by removing feeder contents. Washing the feeder with a disinfectant is recommended if food spoilage occurred. Hopper type feeders have similar problems wherein food debris and unattractive kinds of seed accumulate at the platform feeding area of the feeder diminishing attractiveness to birds, and with wetting by rain results in spoilage of food and food debris. Extended accumulation also leads to the sprouting of seed.

Loiselle, U.S. Pat. No. 5,758,596, titled "Self Cleaning Bird Feeder and Method," addresses the issue of frequent cleaning by using a metal mesh to form the bottom platform of the feeder. The mesh has openings which are small enough to retain the whole grain seed, yet large enough to allow seed husks and other debris to pass through. The Loiselle feeder, however, requires the use of whole seed of a specific size range relative to size and shape of mesh openings. This method, based on sifting, precludes using a given feeder to satisfactorily dispense seed that is larger or smaller than that for which the feeder is designed, and does not lend itself to use of food mixes which contain seed in a wide range of sizes.

Another problem is that the "insert" type of feeding ports typically used in tubular feeders are relatively unattractive to some desirable species of birds, such as cardinals. Furthermore, the insert type port restricts bird access to only a very small portion of the feeder contents, aggravating problems that give rise to the need for periodic cleaning, referred to above.

Additionally, there are problems related to the design of seed trays, generally offered for sale as an option to be installed at the bottom of tubular feeders, which serve to collect food, together with food debris, spilled, or dropped, by birds at feed ports above, providing a feeding area for birds to scavenge food. These problems include the following:

1) Typically seed trays for tubular feeders are poorly drained, prone to wetting by rain, resulting in spoilage of food and food debris, and spouting of seed.
2) Ground feeding birds are attracted to feeding at a seed tray; often these are larger birds such as mourning doves. Seed trays for tubular feeders typically are designed for flush mounting to the bottom of the feeder which places the tray in close proximity to feed ports such that large birds, such as doves, landing at the tray frighten away birds at the feed ports.
3) Seed trays for collecting food spillage from hopper type feeders, that are not pole mounted, generally are designed to be suspended from the feeder by chains or wires extending to the corners or edge of the tray. Tests have shown that such obstructions along the edge of the tray discourage birds from flying onto the tray.

There is also a problem that hopper type feeders tend to provide relatively poor viewing of feeding activity wherein the feeder's hopper typically obstructs viewing of half the birds at the feeder. Large cross-section tubular type feeders have the same problem of obstructed viewing of birds.

The various problems described above, being opportunities to significantly improve performance of bird feeders and increase enjoyment from feeding wild birds, have been addressed by the present invention.

SUMMARY OF THE INVENTION

The present invention has application for improving performance of two fundamentally different types of feeders, namely:

1. Multistage Bird Feeder

A self-cleaning multistage bird feeder which includes several feeding areas attractive to a wide variety of birds is disclosed. The term "multistage" refers to a bird feeder having a plurality of feed portals located at more than one level along the length of the feeder and in which food moves downward through the length of the feeder as birds remove food from the feed portals, tubular feeders being an example. The present feeder is uniquely designed to be substantially self-cleaning by preventing an excessive accumulation of food debris, and unattractive kinds of seeds often contained in bird seed mixes, and by having no dead-ended food inventory.

The present invention is essentially comprised of two novel concepts that greatly improve performance of multistage bird feeders, namely: (1) a novel trough type feed portal, and (2) a novel purge feed portal and suspended seed tray at the bottom of the feeder. The trough type portal attracts greater numbers and variety of birds than conventional portals, and the purge portal provides self-cleaning. Either of the two concepts can be employed alone, but preferably they are employed in combination. Employed alone the purge portal has application for improving conventional tubular feeders to be self cleaning. The advantages from employing the two concepts in combination are a feeder having greater overall attractiveness to birds and enhanced results from self cleaning wherein mixes with a higher content of unattractive kinds of seed can be used than would be possible with conventional feed ports which provide more restricted access to food than the trough type portal. Each of the concepts can be adapted for use in multistage feeders of various sizes and shapes, e.g., various feeder cross-sectional shapes including round, square, rectangular; and there are various possibilities regarding articulation of component parts for assembly of the feeder. The following described feeder is therefore illustrative and not to be interpreted as limiting the scope of the present invention.

The bird feeder presented herein is essentially comprised of a set of truncated hollow cones stacked on the same axis end to end, large end up, with adjacent cones being spaced apart to define circumferential spaces or annular feeding troughs between the relatively smaller end of one cone and a relatively larger end of the next adjacent cone. There are at least two, and preferably three or more cones thereby forming a number of such annular feeding troughs. The feeder includes a cover over the uppermost cone and a disc under the lowermost cone. A tray is suspended below the disc providing a feeding area supplied by food that falls from the disc and annular feeding troughs above. The feeding troughs and the disc are provided with suitably positioned perches.

Food moves downward through the feeder from the uppermost cone to the disc and ultimately to the tray, the movement of food being caused by birds feeding from the troughs and disc area. The disc is spaced a short distance under the lowermost cone.

The space between the disc and bottom edge of the lowermost cone creates a slot-shaped opening through which food and accumulated debris from feeding is purged from the feeder. The slot-shaped opening and disc constitute the purge portal. Food flows onto the disc by activity of birds feeding at the slot and from the disc. Spillage from the disc is the major source of food falling onto the tray suspended under the feeder. Rate of spillage from the disc is a function of height of the slotted opening between the disc and lowermost cone and design of the disc. Purging (spillage to the tray) that provides an adequate supply of food at the tray, results in self-cleaning the feeder while tolerating a relatively high content of unattractive kinds of seed often found in mixes.

The primary objectives and advantages of the invention are therefore to provide a multistage bird feeder that has superior attractiveness to birds, and is substantially self-cleaning through the natural activity of the feeding birds and which is adapted to use a wide variety of commonly used bird food. Additionally, the design of the feeder gives high efficiency in use of food, allows use of lower quality feed with respect to cleaning, presumably lower priced food. The preferred design apportions food inventory within the feeder such that food storage capacity above the uppermost feed portal is relatively large to reduce frequency of filling, tapering to a narrow cross section that allows good relatively unobstructed viewing of birds. The suspended tray, with its center post support, enhances attractiveness to birds compared to the usual arrangement of installing a tray flush with the bottom of the feeder. An apertured tray is used so as to promote rapid drying of food following rain and prevent food spoiling and sprouting of seed.

2. Hopper-Type Bird Feeders

A hopper type feeder that has a self cleaning platform feeding area and that is improved to have fuller viewing of feeding activity is disclosed.

The purge feed portal with suspended tray described above has application for improving the design and performance of hopper type feeders wherein the conventional platform feeding area of the feeder is replaced by a purge portal with suspended tray, thereby improving the feeder so as to have a self cleaning platform feeding area and provide fuller viewing of feeding activity. Approximately 90% of the birds can be viewed versus about 50% for the typical conventional hopper type feeder. The tray provides unobstructed viewing and is an attractive site for feeding, accommodating half or more of the birds at the feeder. The design features of the purge portal with suspended tray, apertured tray, etc., are the same as for multistage feeders as described above.

Other objectives and advantages of the invention will become apparent from the following description taken in connection with the accompanying drawings which set forth, by way of illustration and example, certain preferred embodiments of the present invention.

BRIEF DESCRIPTION OF THE DRAWINGS

The drawings, which constitute a part of the specification and include an exemplary embodiment of the present invention, include the following.

DETAILED DESCRIPTION OF THE PREFERRED EMBODIMENT

Figure 1:
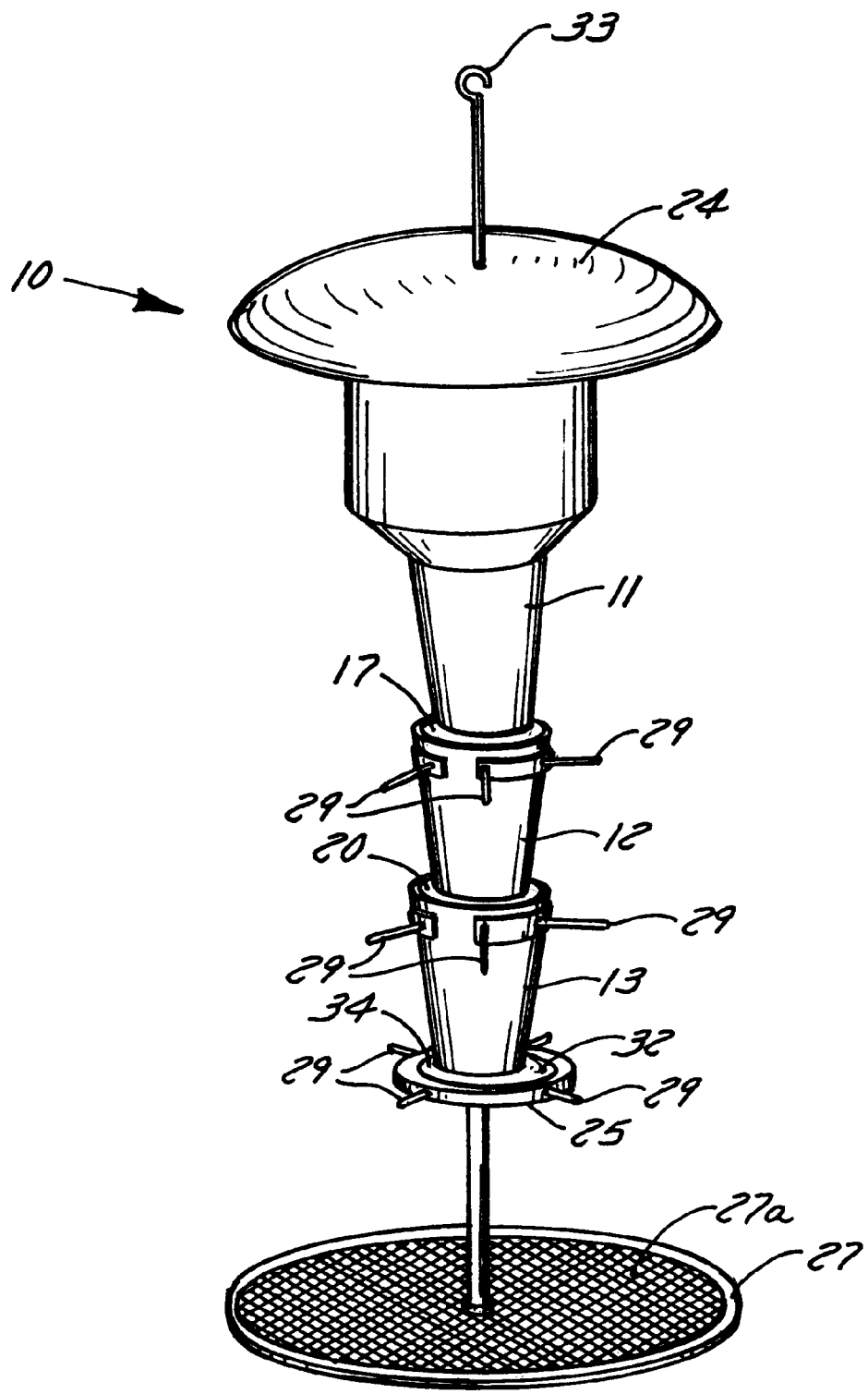
FIG. 1 is a side elevation view of the multistage bird feeder of the present invention.
Figure 2:
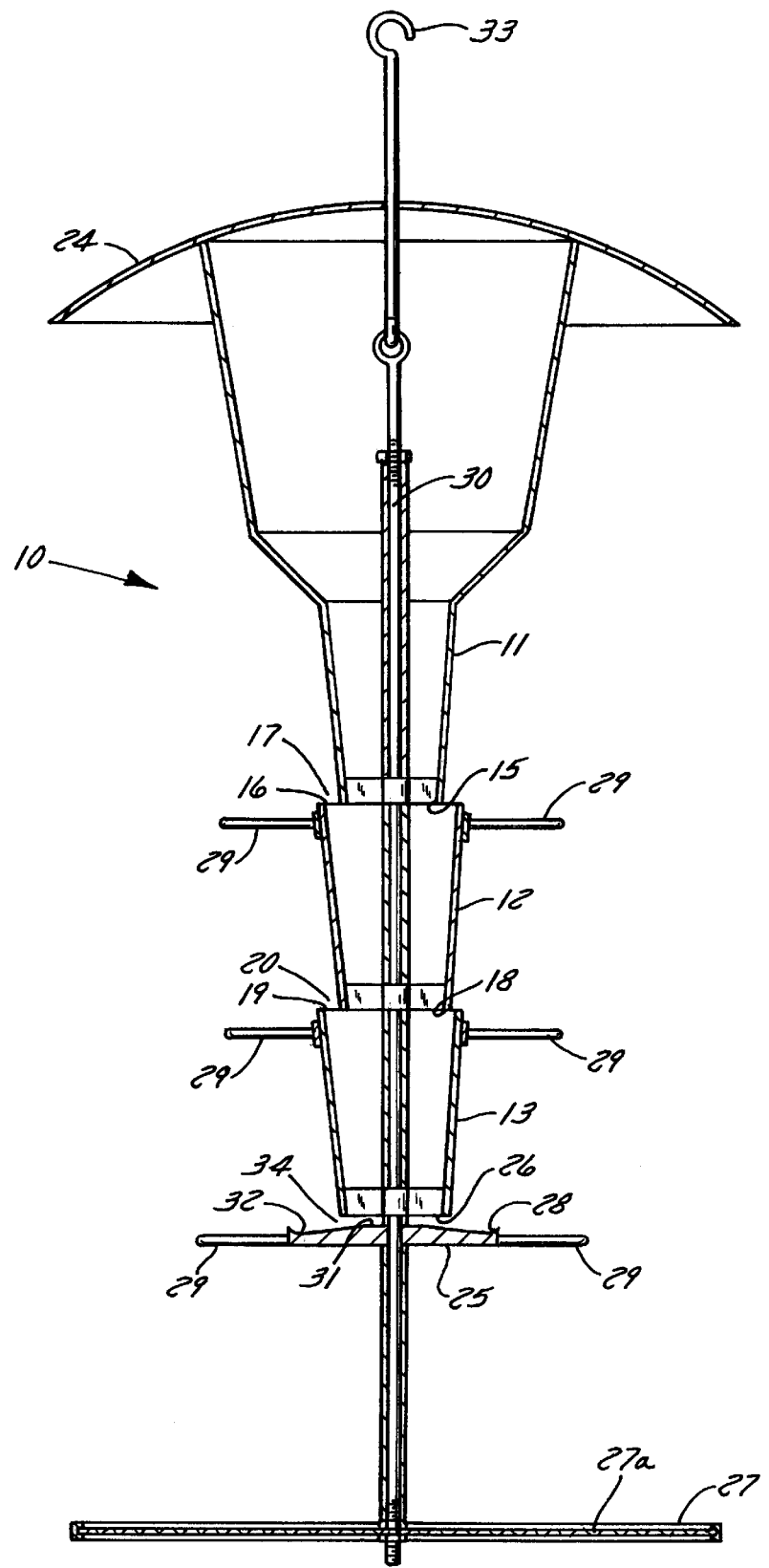
FIG. 2 is a cross-section view of the multistage bird feeder of the present invention.

With reference to FIGS. 1 and 2, a bird feeder 10 of the present invention is comprised of three sections with feeding portals at three levels constituting three stages. Each section may be generally described as a truncated hollow cone. Alternatively, each section may be comprised of other funnel-like geometric shapes, such as pyramids, described generally as a frustum. The term "frustum" refers to that part of a solid body, such as a cone or pyramid, next to the base that is formed by cutting off the top by a plane parallel to the base. See, e.g., *Webster's New Collegiate Dictionary* (Merriam-Webster) 1981, p. 459, and *Funk & Wagnall's New Comprehensive Dictionary of the English Language,* 1978, p. 510. Regardless of the particular geometric shape, each funnel-like section is comprised of a wall which forms the outer periphery of the section, with the wall extending downwardly from a relatively large upper opening, and becoming progressively narrower and terminating at a relatively smaller lower opening. Consequently, for each section, the upper opening is wider than the lower opening.

The bird feeder 10 is constructed by vertically stacking on a common axis at least two sections, and preferably three or more sections, one on top of the other. The sections are stacked end to end, large end up so that the lower opening of one section is contained within the relatively larger upper opening of the next adjacent section, thereby forming a feeding trough between the two sections. For conical sections, the feeding trough could be described more particularly as an annular feeding trough. A plurality of sections stacked together form a corresponding plurality of peripheral or annular feed openings between adjacent sections. Additionally, the sections are arranged so that, when the feeder is filled with bird food, the food in one section will flow downward through the relatively narrow lower opening of one section directly into the relatively wider opening of the next adjacent section. The feed naturally seeks a level within the troughs that is somewhat below overflow level.

With reference to FIGS. 1 and 2, the particular bird feeder 10 depicted therein is constructed from three separate, generally conical-shaped sections, namely, a first conical section 11, a second conical section 12, and a third conical section 13. The first conical section 11 is vertically stacked on top of the second conical section 12, and the second conical section 12 is vertically stacked on top of the third conical section 13. The sections are arranged so that a space between the lower opening 15 of the first conical section 11 and the upper opening 16 of the second conical section defines a first annular feed trough opening 17. Another space between the lower opening 18 of the second conical section 12 and the upper opening 19 of the third conical section 13 defines a second annular feed trough opening 20. If desired, additional feeding troughs can be fabricated by assembling additional conical-shaped sections in a similar manner.

A cover 24 over the upper opening of the first conical section 11 covers the bird feeder 10 to provide weather protection and can be designed to also serve as a "squirrel guard" of the type commonly used to provide protection from squirrels. The diameter of the cover 24 is preferably sufficiently large to provide weather protection over the annular feed troughs from rain and snow. The cover 24 is also preferably easily removable from the top of the bird feeder so that the feeder may be conveniently filled with food.

Under the lowermost conical section, namely, the third conical section 13, is a disc 25 which is spaced apart a short distance from the lower opening 26 of the lowermost conical section 13 to form a slot-shaped opening 34. Food is dispensed onto disc 25 by activity of birds feeding at opening 34 and from the surface of disc 25. The disc 25 also includes a plurality of perches 29 spaced around the outer periphery of the disc 25. The slot-shaped opening 34 and disc 25 constitute a purge portal from which spillage provides a supply of food to tray 27. Design of disc 25 preferably includes an upward extending lip 28 around the periphery of the disc 25 that serves to increase inventory of food on disc 25 for feeding from disc 25, and also serves to restrict the rate of food spillage to tray 27. Preferably, the diameter of the disc 25 is such that birds standing on the perches 29 extending outward from the perimeter of the disc 25 not only can feed from the disc 25, but also can reach and feed from slot-shaped opening 34. The center of the disc 25, under opening 26, preferably is contoured so that the central portion 31 is crowned higher than the exterior portion 32 of the disc and lip 28 to limit intrusion of water into opening 34 in the event of rain.

The tray 27 is preferably made from an apertured material, such as expanded mesh, perforated steel, or other comparable materials. The pattern of holes 27a in the tray permits moisture to drain through the tray. The holes are small enough so that the tray nonetheless retains seed on the upper surface of the tray. The tray 27 therefore provides an additional feeding area.

Figure 5:
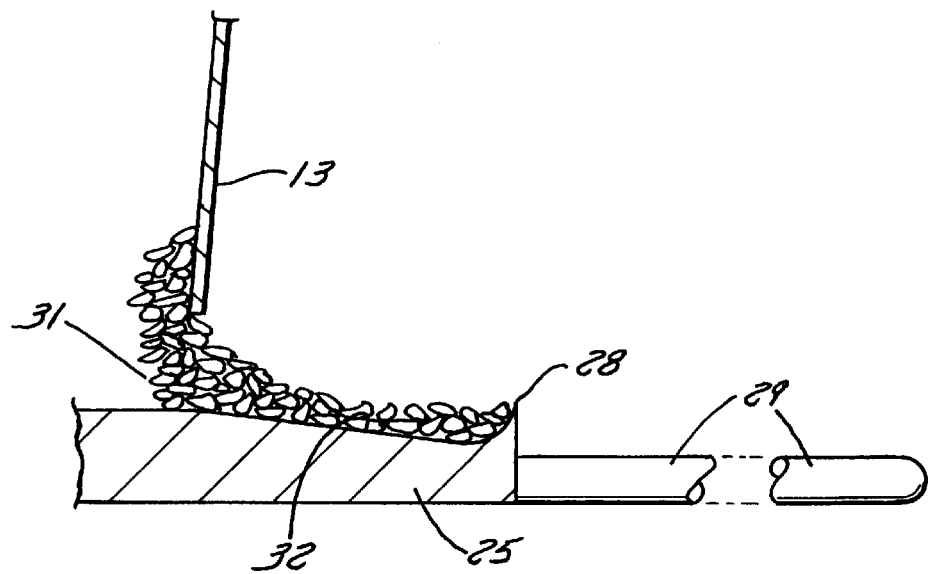
FIG. 5 is a cross-section view of the purge portal formed by the space between the disc and bottom edge of the lowermost cone.

The purge portal, comprised of opening 34 and disc 25, preferably is designed to provide the major source of supply of food to tray 27, with minimal spillage occurring from annular feed troughs up above, that being the optimum distribution of food supply to tray 27 for most effective self-cleaning of the feeder. A purge rate sufficient to feed several birds at tray 27 for each bird feeding at the purge feed portal provides excellent results with respect to self-cleaning. This purge rate is achievable using the purge food portal concept illustrated in FIGS. 1, 2 and 5 and greatly exceeds the incidental spillage that occurs from birds feeding at "insert" type feed portals typically used in current bird feeders which provide inadequate purging for self-cleaning purposes.

For example, in performance tests that compared a feeder of the present invention versus a Droll Yankees B-7 tubular feeder with "seed baffle" using black oil sunflower seed bird food, the lowest portals of the B-7 feeder became inoperable, no food reaching them due to excessive accumulation of food debris. The problem was exacerbated by the relatively close clearance between the seed baffle and lowest portals on the B-7. In comparison, the feeder of the present invention was not adversely affected in its operating performance or attractiveness to birds, at times having birds on every perch and as many as ten birds on the tray suspended under the feeder.

The feeder also includes a number of perches 29. Specifically, perches 29 are placed on the upper portion of each section 12 and 13, positioned to provide birds access for feeding at each of the annular feeding troughs 17 and 20. As mentioned, perches are also mounted to the disc 25 positioned to provide birds access for feeding from the purge portal comprised of opening 34 and disc 25. The perches 29 preferably are conventional rod type perches which protrude outwardly from the walls of the conical sections, and on the disc 25 the perches protrude outwardly from its periphery.

Figure 3:
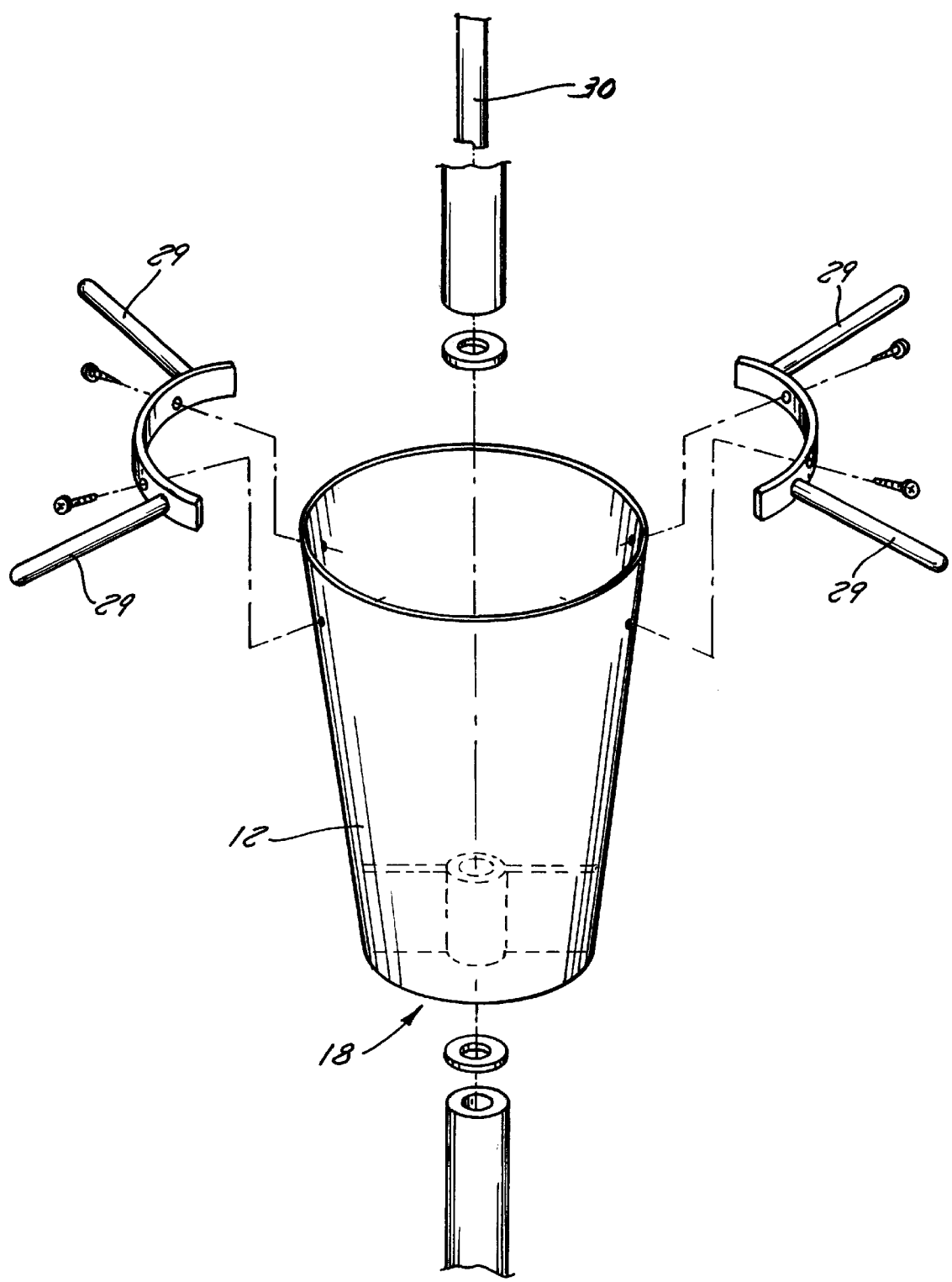
FIG. 3 is an exploded perspective view of one of the cone sections to illustrate an exemplary method for assembling the multistage bird feeder.
Figure 4:
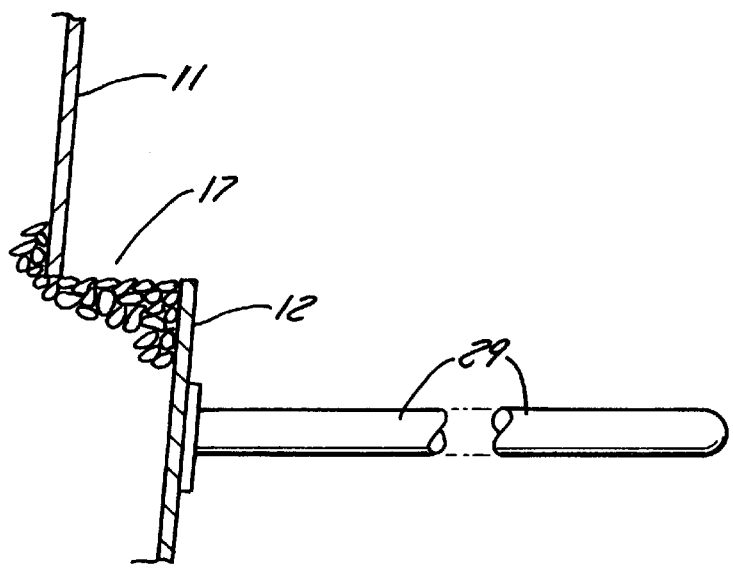
FIG. 4 is a cross-section view of a feeding portal formed by the space between two adjacent cones.

The separate sections of the bird feeder may be assembled together in any conventional manner. Referring to FIGS. 2 and 3, the various sections may be assembled to an elongated rod 30 which extends downwardly through a central axis of the bird feeder, with each section having an internal bracket with tubular sleeve and washer 35 for assembly to rod 30. Alternatively, the walls of adjacent conical sections may be fastened together by using appropriate spacers and fasteners.

Figure 6:
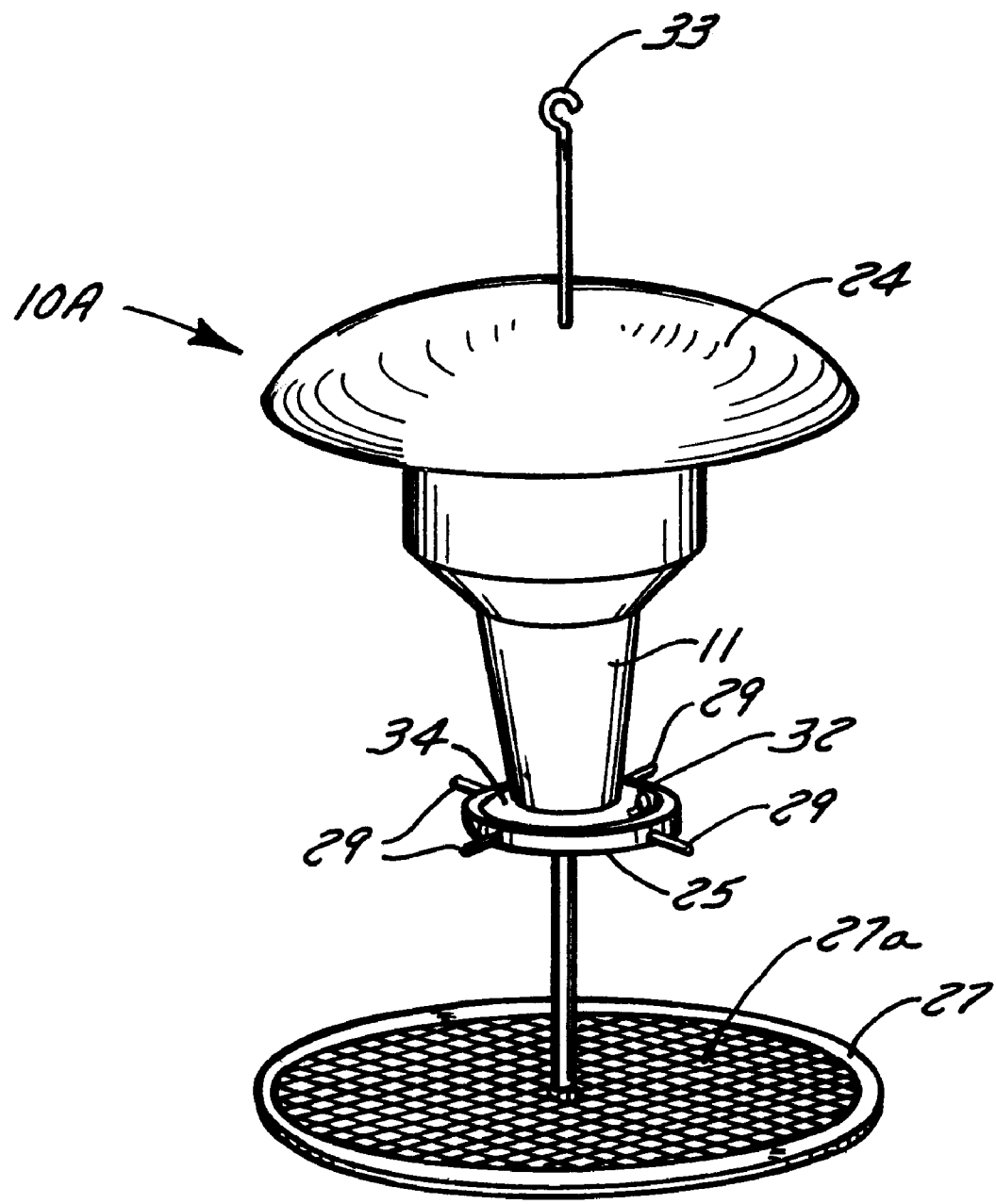
FIG. 6 is a side elevation view of the hopper bird feeder version of the present invention.

FIG. 6 illustrates a hopper-type feeder 10A constructed substantially the same as the multi-stage feeder described above except that it is comprised of only a single conical section 11; wherein the feeder uses the purge portal concept of disc 25 and suspended tray 27, as described above, to provide superior performance compared to conventional hopper type feeders, namely by: (1) providing a self-cleaning feeding platform, (2) fuller viewing of feeding activity, (3) attracting greater numbers of birds.

The bird feeders depicted in FIGS. 1, 2 and 6 include an upper eyelet 33 for suspending the bird feeder from a tree branch, beam, or other high place. Alternatively, the bird feeder may be mounted from below on a post or pole.

Therefore, specific structural details disclosed above are not to be interpreted in limiting the scope of the present invention, but are provided merely as a basis for the claims and for teaching one skilled in the art to employ the present invention in any appropriately detailed structure. Changes may be made in the specific structural details of the preferred embodiment described above without departing from the spirit of the invention, especially as defined in the following claims.

What is claimed is:

1. A bird feeder comprising:
a tubular feed container;
a feed port at the bottom of said tubular feed container wherein said feed port comprises a disc under an opening in the bottom of the tubular feed container, said disc being spaced apart a short distance from the bottom opening to provide a space for purging feed from said bird feeder, said purge being activated by birds feeding at said feed port; and
a tray suspended under said disc for catching feed purged from said feed port, wherein said feeder further comprises:
one or more perches extending outwardly from an outer perimeter of said disc, and,
the outer perimeter of the disc is limited relative to the diameter of the opening in the bottom of the tubular feed container such that birds feeding from said perches can reach and feed from said feed port, including from said space through which food is purged from said bird feeder.

2. A bird feeder comprising:
a tubular feed container; and
a feed port at the bottom of said tubular feed container wherein said feed port comprises a disc under an opening in the bottom of the tubular feed container, said disc being spaced apart a short distance from the bottom opening to provide a space for purging feed from said bird feeder, said purge being activated by birds feeding at said feed port; and
a tray suspended under said disc for catching feed purged from said feed port, wherein said tubular feed container further comprises:
a first hopper section;
a second hopper section; and,
a space between the first and second hopper sections.

3. A bird feeder of claim 2, further comprising:
a louvered opening between the first and second hopper sections, said louvered opening defining a trough type feed portal.

4. A bird feeder of claim 3, further comprising a roof overhanging said louvered opening providing weather protection of said opening from rain and snow.

5. A bird feeder comprising:
a tubular feed container; and
a feed port at the bottom of said tubular feed container wherein said feed port comprises a disc under an opening in the bottom of the tubular feed container, said disc being spaced apart a short distance from the bottom opening to provide a space for purging feed from said bird feeder, said purge being activated by birds feeding at said feed; and
a tray suspended under said disc for catching feed purged from said feed port, wherein said tray comprises an apertured member having a pattern of small holes which permit moisture to drain through said tray yet retain seed on the upper surface of said tray.

6. A bird feeder comprising:
a plurality of upside down hollow frustums, each frustum being comprised of a wall defining a geometric shape with an upper opening and a lower opening, for each frustum the upper opening being wider than the lower opening, said plurality of frustums being stacked vertically end to end on a common axis so that the lower opening of one frustum is contained within a relatively wider upper opening of the next adjacent frustum to thereby define a peripheral feed trough between said adjacent frustums;
a cover over the upper opening of the uppermost frustum; and,
a disc under the lower opening of the lowermost frustum, said disc being spaced apart a short distance from said lower opening to provide a space for purging food from said bird feeder, said purge activated by birds feeding at said disc.

7. The bird feeder of claim 6, further comprising a plurality of perches around the peripheral feed troughs.

8. The bird feeder of claim 7, wherein the perches are comprised of rods extending outwardly from the frustums at a location below the annular feed troughs, said perches being positioned to give birds access for feeding from said feed troughs.

9. The bird feeder of claim 8, further comprising a plurality of perches around each annular feed trough.

10. The bird feeder of claim 6, further comprising a tray suspended below the disc for catching bird feed that spills from the disc.

11. The bird feeder of claim 10, wherein the tray is an apertured member having a pattern of small holes which permit moisture to drain through the tray yet retain seed on the upper surface of the tray.

12. The bird feeder of claim 6, wherein the cover is substantially wider than the upper opening of the uppermost frustum.

13. The bird feeder of claim 6, wherein the plurality of upside down hollow frustums is comprised of at least two (2) frustums.

14. The bird feeder of claim 13, wherein each frustum in the vertical stack of frustums has a relative cross section which is progressively narrower from top to bottom.

15. The bird feeder of claim 14, wherein the frustums are each cone-shaped, and the peripheral feed troughs are annular.

16. The bird feeder of claim 6, wherein the disc further comprises an upward extending lip around the periphery of the disc.

17. A bird feeder of claim 6, wherein the disc further comprises a contoured central portion which is crowned relatively higher than periphery of the disc.

18. The bird feeder of claim 6, wherein the disc further comprises a plurality of perches extending outwardly from the periphery of said disc.

19. A bird feeder of claim 6, wherein diameter of said disc is limited such that birds feeding at said disc from perches extending outward from perimeter of said disc can reach and feed from opening between said lowermost frustum and said disc.

20. A multistage bird feeder comprising:
a plurality of truncated hollow cones stacked vertically end to end, large end up, with adjacent cones being spaced apart to define a plurality of annular feeding troughs, a cover over the uppermost cone and a disc under the lowermost cone, a plurality of perches extending outwardly from the cones and the disc, and an apertured tray suspended under the disc.

21. The multistage bird feeder of claim 20, said feeder comprising at least two (2) cones.

22. A bird feeder comprising:
an upside down hollow frustum having a top opening and a bottom opening;
a cover over the top opening of said frustum;
a disc under the bottom opening of said frustum; and,
a tray suspended under said disc.

23. A bird feeder of claim 22 wherein a plurality of perches extend outward from said disc.

24. A bird feeder of claim 23, wherein the diameter of said disc is limited such that birds feeding from the perches can reach and feed from the bottom opening through which food flows from bottom of said frustum.

25. A bird feeder of claim 22, wherein the disc further comprises a contoured central portion which is crowned relatively higher than periphery of said disc.

26. A bird feeder of claim 22, wherein said disc further comprises an upward extending lip around the periphery of said disc.

27. A bird feeder of claim 22, wherein said tray is an apertured member having a pattern of small holes which permit moisture to drain through said disc yet retain seed on the upper surface of said disc.

28. A bird feeder of claim 22, wherein the perimeter shape of said disc substantially conforms to the perimeter shape of the bottom of said feeder.

29. A bird feeder of claim 22 wherein said frustum comprises a conical feed container.

30. A multistage bird feeder comprising:

a tubular feed container; and a feed port at the bottom of said tubular feed container wherein said feed port comprises a disc under an opening in the bottom of the tubular feed container, said disc being spaced apart a short distance from the bottom opening to provide a space for purging feed from said bird feeder, said purge being activated by birds feeding at said feed port; and a tray suspended under said disc for catching feed purged from said feed port, wherein said feeder further comprises a feeder having a plurality of feed portals at more than one level along the vertical length of said tubular feed container and in which food moves downward through the length of said tubular feed container as birds remove food from the feed portals.

31. A multistage bird feeder comprising:

a tubular feed container; and a feed port at the bottom of said tubular feed container wherein said feed port comprises a disc under an opening in the bottom of the tubular feed container, said disc being spaced apart a short distance from the bottom opening to provide a space for purging feed from said bird feeder, said purge being activated by birds feeding at said feed port; and a tray suspended under said disc for catching feed purged from said feed port, wherein said feeder further comprises:

one or more perches extending outwardly from an outer perimeter of said disc; and the outer perimeter of the disc is limited relative to the diameter of the opening in the bottom of the tubular feed container such that birds feeding from said perches can reach and feed from said disc and space through which food flows from the bottom of said tubular feed container.

32. A multistage bird feeder comprising:

a tubular feed container; and a feed port at the bottom of said tubular feed container wherein said feed port comprises a disc under an opening in the bottom of the tubular feed container, said disc being spaced apart a short distance from the bottom opening to provide a space for purging feed from said bird feeder, said purge being activated by birds feeding at said feed port; and a tray suspended under said disc for catching feed purged from said feed port, wherein said tubular feed container further comprises:

a first hopper section;

a second hopper section; and, a space between the first and second hopper sections.

33. A bird feeder of claim 32, further comprising:

a louvered opening between the first and second hopper sections, said louvered opening defining a trough type feed portal.

34. A bird feeder of claim 33, further comprising a roof overhanging said louvered opening providing weather protection of said opening from rain and snow.

35. A multistage bird feeder comprising:

a tubular feed container; and a feed port at the bottom of said tubular feed container wherein said feed port comprises a disc under an opening in the bottom of the tubular feed container, said disc being spaced apart a short distance from the bottom opening to provide a space for purging feed from said bird feeder, said purge being activated by birds feeding at said feed port; and a tray suspended under said disc for catching feed purged from said feed port, wherein said tray comprises an apertured member having a pattern of small holes which permit moisture to drain through said tray yet retain seed on the upper surface of said tray.

36. A bird feeder comprising:

a tubular feed container; and a feed port at the bottom of said tubular feed container wherein said feed port comprises a disc under an opening in the bottom of the tubular feed container, said disc being spaced apart a short distance from the bottom opening to provide a space for purging feed from said bird feeder, said purge being activated by birds feeding at said feed port; and a tray suspended under said disc for catching feed purged from said feed port; and one or more perches extending outwardly from an outer perimeter of said disc; and the outer perimeter of the disc is limited relative to the diameter of the opening in the bottom of the tubular feed container such that birds feeding from said perches can reach and feed from said disc and space through which food flows from bottom of said tubular feed container.

37. A bird feeder of claim 36 wherein said bird feeder further comprises a multistage bird feeder having a feed port at one or more levels above said feed port at bottom of said tubular feed container.

38. A bird feeder of claim 36 wherein said bird feeder further comprises a single stage bird feeder having no feed ports other than said feed port at bottom of said tubular feed container.

39. A bird feeder of claim 36 wherein said tubular feed container further comprises a hopper type feed container.

40. A bird feeder of claim 36, wherein the disc further comprises a contoured central portion which is crowned relatively higher than periphery of said disc.

41. A bird feeder of claim 36, wherein said disc further comprises an upward extending lip around the periphery of said disc.

42. A bird feeder of claim 36, wherein said tray is an apertured member having a pattern of small holes which permit moisture to drain through said disc yet retain seed on the upper surface of said disc.

43. A bird feeder of claim 36, wherein the perimeter shape of said disc substantially conforms to the perimeter shape of the bottom of said feeder.

44. A bird feeder of claim 36 wherein a provision is made to adjust spacing between said disc and bottom of said feed container such as to accommodate a range of feed particle sizes in optimizing control of said purge.

* * * * *